United States Patent
Magaldi et al.

(10) Patent No.: US 12,085,346 B2
(45) Date of Patent: Sep. 10, 2024

(54) FLUIDIZED BED HEAT EXCHANGER AND METHOD

(71) Applicant: MAGALDI POWER S.P.A., Rome (IT)

(72) Inventors: Mario Magaldi, Salerno (IT); Fulvio Bassetti, Salerno (IT)

(73) Assignee: MAGALDI POWER S.P.A., Rome (IT)

( * ) Notice: Subject to any disclaimer, the term of this patent is extended or adjusted under 35 U.S.C. 154(b) by 1 day.

(21) Appl. No.: 18/252,938

(22) PCT Filed: Nov. 16, 2020

(86) PCT No.: PCT/IB2020/060761
§ 371 (c)(1),
(2) Date: May 15, 2023

(87) PCT Pub. No.: WO2022/101669
PCT Pub. Date: May 19, 2022

(65) Prior Publication Data
US 2023/0296326 A1    Sep. 21, 2023

(51) Int. Cl.
*F28D 19/02*    (2006.01)
*F28D 13/00*    (2006.01)
*F28D 20/00*    (2006.01)

(52) U.S. Cl.
CPC ............. *F28D 19/02* (2013.01); *F28D 13/00* (2013.01); *F28D 20/0056* (2013.01)

(58) Field of Classification Search
CPC ....... F28D 19/02; F28D 13/00; F28D 20/0056
(Continued)

(56) References Cited

U.S. PATENT DOCUMENTS

| 3,908,632 | A | 9/1975 | Poulsen |
| 3,973,552 | A | 8/1976 | Ervin, Jr. |

(Continued)

FOREIGN PATENT DOCUMENTS

| CN | 110360862 A | 10/2019 |
| DE | 10149806 A1 | 4/2003 |

(Continued)

OTHER PUBLICATIONS

International Search Report and Written Opinion for Corresponding International Application No. PCT/IB2020/060761, 11 pages, Aug. 5, 2021.

(Continued)

*Primary Examiner* — Jon T. Schermerhorn, Jr.
(74) *Attorney, Agent, or Firm* — Lucas & Mercanti, LLP

(57) ABSTRACT

An apparatus for the accumulation and transfer of thermal energy is disclosed including a thermal energy charging device having a bed of fluidizable solid particles received within a casing and acting as heat accumulation means by being exposed to a thermal energy source, heat exchange means operating in counter-current, configured for an exchange of thermal energy between a heated vector mass of the bed particles and an operative fluid, transport means configured for feeding the vector mass of the bed particles from the device to the heat exchange means and for returning part of the vector mass, downstream the heat exchange means, to the device, and a control unit associated with parameter detecting means arranged selected locations of the apparatus to control the flow of the vector mass within the apparatus.

20 Claims, 8 Drawing Sheets

(58) Field of Classification Search
USPC .............................................................. 165/4
See application file for complete search history.

(56) References Cited

U.S. PATENT DOCUMENTS

| | | | |
|---|---|---|---|
| 4,361,009 A * | 11/1982 | Schluderberg | F28D 20/0056 |
| | | | 60/659 |
| 4,479,353 A * | 10/1984 | Schluderberg | F28D 20/0056 |
| | | | 165/145 |
| 11,047,601 B2 * | 6/2021 | Ling | F24S 30/452 |
| 11,609,026 B2 * | 3/2023 | Ho | F03G 6/108 |
| 11,808,523 B2 * | 11/2023 | Ma | F28D 20/0056 |
| 2013/0042857 A1 | 2/2013 | Magaldi et al. | |
| 2014/0298822 A1 | 10/2014 | Ma | |
| 2014/0311479 A1 * | 10/2014 | Maryamchik | F03G 6/067 |
| | | | 126/714 |
| 2016/0017869 A1 | 1/2016 | Sakadjian et al. | |
| 2017/0159503 A1 | 6/2017 | Plais et al. | |
| 2018/0266728 A1 * | 9/2018 | Abbasi | F28D 20/0056 |
| 2020/0124356 A1 | 4/2020 | Ma et al. | |
| 2023/0221040 A1 * | 7/2023 | Ho | F24S 50/40 |
| | | | 60/641.15 |

FOREIGN PATENT DOCUMENTS

| | | |
|---|---|---|
| JP | S6073218 A | 4/1985 |
| WO | 2014166878 A1 | 10/2014 |

OTHER PUBLICATIONS

International Preliminary Report on Patentability for Corresponding International Application No. PCT/IB2020/060761 (24 Pages) (Oct. 6, 2022).

* cited by examiner

FLUIDIZED BED HEAT EXCHANGER AND METHOD

CROSS-REFERENCE TO RELATED APPLICATIONS

This application is a 371 of PCT/IB2020/060761, filed Nov. 16, 2020.

FIELD OF THE INVENTION

The present invention relates mainly to a device, system and method for the accumulation and transfer of thermal energy.

In particular, the invention uses devices for the accumulation of thermal energy based upon a bed of fluidizable solid particles.

BACKGROUND OF THE INVENTION

Devices for the accumulation and transfer of thermal energy based upon a fluid, or fluidizable, bed of solid particles are known in the art.

In the above-mentioned systems, heat exchangers are immersed into the particle bed. Such exchangers may be based, e.g., upon tube bundles crossed by an operative fluid like, e.g., steam or $CO_2$.

In its simplest configuration, the particle bed can be assumed as isothermal, i.e. as a mass wherein each and any particle has the same temperature. This approximation is acceptable due to the high thermal diffusivity within the entire fluidized bed. In these conditions, thermal energy is stored in the bed in the form of sensible heat of solid particles, given by $$Q = m * c_p * \Delta T \quad [1],$$

wherein:
Q is the thermal energy stored in the fluid bed,
m is the total mass of the bed particles,
$c_p$ is the specific heat capacity of the particles
$\Delta T$ is the difference of solid particle temperature ($T_{max} - T_{min}$), wherein $T_{min}$ and $T_{max}$ are respectively the minimum and maximum operating temperature of the bed particles during the thermal exchange.

Given the above, when the bed has been charged with thermal energy, i.e. when it has been heated, such energy can be released to a heat transfer fluid (HTF), such as steam, $CO_2$, supercritical $CO_2$ and the like, by means of said heat exchangers immersed in the bed.

The temperature produced in the HTF is, of course, always lower than the bed temperature and can be adjusted (e.g. by means of so-called steam desuperheaters), in order to meet the conditions desired for use.

For better understanding, the diagrams of FIGS. 1 to 3 show possible temperature trends of the bed mass (e.g. as made of sand particles) and of the heat transfer fluid (e.g. steam), in a case where $T_{min}$ is assumed at 350° C., $T_{max}$ at 620° C. and steam generation time is 6 hours.

In particular, FIG. 1 shows a steam temperature constantly decreasing along with solid particles temperature decrease, FIG. 2 shows a steam generation profile at 500° C. for the first two hours and then decreasing along with solid particles temperature decrease, whereas FIG. 3 shows a steam generation at 300° C. constant for the entire period.

It is important to note that the above diagrams show that, in all cases, the HTF is produced, at least for an interval of time, at a temperature below the fluid bed minimum temperature (in the example shown $T_{min}$=350° C.).

In other words, for an application where the HTF is needed at, for example, 500° C. constantly, the solution shown above cannot work, unless the particle minimum temperature is increased above 500° C. (e.g. at 530° C.).

However, this increase in $T_{min}$ would have a heavy negative impact on the thermal storage capacity, since the solid particle operational $\Delta T$ will be reduced significantly. To stay in the example above, $\Delta T$ would be reduced from (620-350°) C=270° C. to (620-530°) C=90° C., which means that the thermal storage capacity would be reduced by ⅓, if steam must be produced at 500° C. rather than at 300° C.

Theoretically, this gap could be recovered by increasing the fluid bed maximum temperature ($T_{max}$), but this increase may be not feasible (and/or not economical), particularly because of the operational limits of the materials the heat exchangers are made of. Making reference, again, to the example above, in order to produce steam constantly at 500° C., by adopting fluid bed minimum temperature ($T_{min}$) at 530° C. and keeping the same thermal energy storage capacity, the fluid bed maximum temperature should raise from 620° C. up to 800° C. (i.e. 530+$\Delta T$=530+270=800° C.), which may be unpracticable for limits of the heat exchanger materials.

Another possible countermeasure to keep the same thermal storage capacity, when producing steam at higher temperature (e.g. 500° C.), would be to increase the solid particle mass, but again, that would involve much larger modules (in the example, three times larger), with significant cost increase.

The above considerations are even more important in case the HTF is supercritical $CO_2$, which is nowadays expected to be able to drive a turbine with estimated thermal to electric efficiency up to 50% provided that supercritical $CO_2$ is delivered to the turbine at temperature over 700° C. (and pressure over 200 bar).

In these cases, the fluid bed should be working in a very high temperature range (for example, say, from 730° C. up 1000° C.), which, even if possible for the solid particles, could make the construction of the immersed heat exchangers not feasible, or their lifetime too short, due to the aforementioned material limits.

Therefore, there is a need for devices, systems and methods based upon fluid particle bed allowing accumulation and exchange of thermal energy in a more effective way, particularly in certain fields of application.

SUMMARY OF THE INVENTION

The technical problem posed and solved by the present invention is, therefore, to provide a heat storage and transfer configuration based upon a fluid bed of solid particles allowing overcoming one or more of the drawbacks or criticalities mentioned above with reference to the known art.

An object of the present invention is to provide a device, apparatus, system and/or method for accumulating and transferring energy in thermal form which is of particular effectiveness, especially to guarantee continuous generation of high temperature heat transfer fluid for supplying electric or thermal energy to a final user.

According to another aspect, the present invention aims at overcoming some performance limits intrinsically associated with the heat transfer mechanism of a thermal energy storage made by a fluidized bed of solid particles equipped with heat exchangers immersed in the same particle bed exposed to a thermal energy source.

The above-mentioned objectives are attained by an apparatus according to claim 1 and by a method according to claim 13.

Preferred features of the invention are recited in the dependent claims.

The invention is based upon a device allowing an accumulation of energy, in thermal form, in a bed of fluidized solid particles and a contemporary or deferred transfer of the accumulated energy to an operative fluid.

The configuration of the invention allows an efficient and flexible use of the outgoing energy based upon the needs of a final user. Advantageously, the accumulated energy can be transformed into electric energy or directly used in thermal form or even be subject to a combined use of such two forms in industrial applications (CHP, Combined Heat and Power plants).

The invention is applicable to a so-called "concentrated-solar-power" configuration, wherein thermal power is charged into the storage bed by sunrays, i.e. by the solar radiation impinging upon it, either directly or indirectly, e.g. after one or more reflections or re-irradiations, with or without means, e.g. transparent screens, interposed between the bed and the solar source/radiation.

Compared to other concentrated solar power solutions based on solid particles, the solar receiver/heat accumulation device based upon fluid bed technology offers a buffer time to heat up the particles, with higher capability of guaranteeing solid particles temperature control, for higher performance and safety of operation. This feature is particularly important during abrupt transients of solar power input into the receiver device, like sudden appearing/disappearing of clouds, or anyway to handle the solar radiation that varies during daytime: the fluid bed of solid particles works like a thermal flywheel, allowing excellent heat transfer, significant heat-capacity with a homogeneous temperature field, and it is able to absorb thermal shocks, not only due to the temperature resistance of solid particles, but also thanks to the continuous mixing of fluidized solid particles, which provides high thermal diffusivity, continuous renewal of material exposed to concentrated sunrays and sufficient residence time to bring the particles to the temperature level desired for use.

The invention is also applicable to a configuration wherein thermal resistors or thermally equivalent means are immersed in, or in thermal connection with, the fluidized bed of particles, i.e. wherein charging of thermal power in the bed is made by Joule effect (thus by electricity), by a hot heat transfer fluid, by waste heat, or combinations thereof. In particular, said bed heating means may use low cost electric energy, for example coming from a renewable source, particularly wind or photovoltaic energy, or residual thermal energy, that is thermal waste from industrial processes.

The invention is also applicable to hybrid solutions, wherein thermal energy charging into the bed occurs by combination of different power sources, like sunrays, electricity, heat transfer fluid, waste heat or other.

Additional advantages, features and use modes of the present invention will result evident from the following detailed description of some embodiments thereof, disclosed by way of example and not for limitative purposes.

BRIEF DESCRIPTION OF THE FIGURES

The figures of the enclosed drawings will be referred to, wherein.

DETAILED DESCRIPTION OF PREFERRED EMBODIMENTS OF THE INVENTION

Embodiments and variants of the invention will be described hereinafter, with main reference to the above-mentioned figures.

In the following detailed description, additional embodiments and variants with respect to embodiments and variants already dealt with in the same description will be illustrated only in conjunction with the differences with respect to what already illustrated.

Moreover, the various embodiments and variants described hereinafter, as well as the relative components, means and elements, can be used in combination, when compatible.

Figure 1:
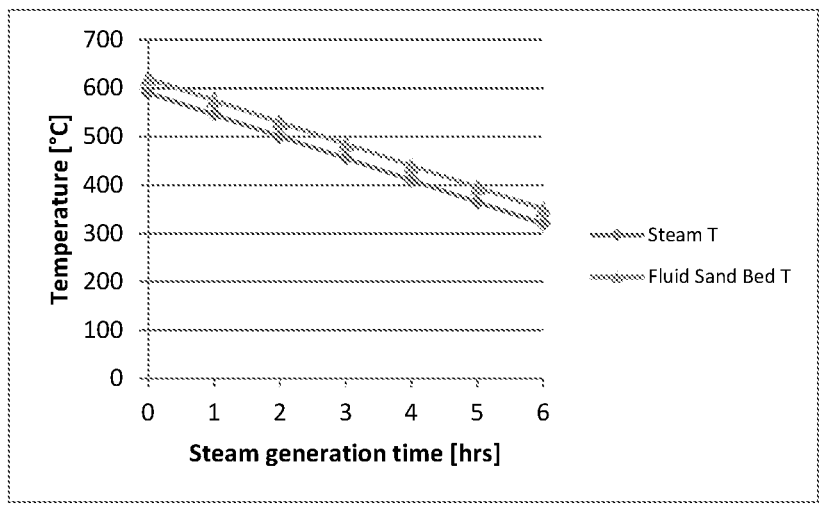
FIGS. 1 to 3 show diagrams which have already been introduced in the "Background" section of the present disclosure.
Figure 2:
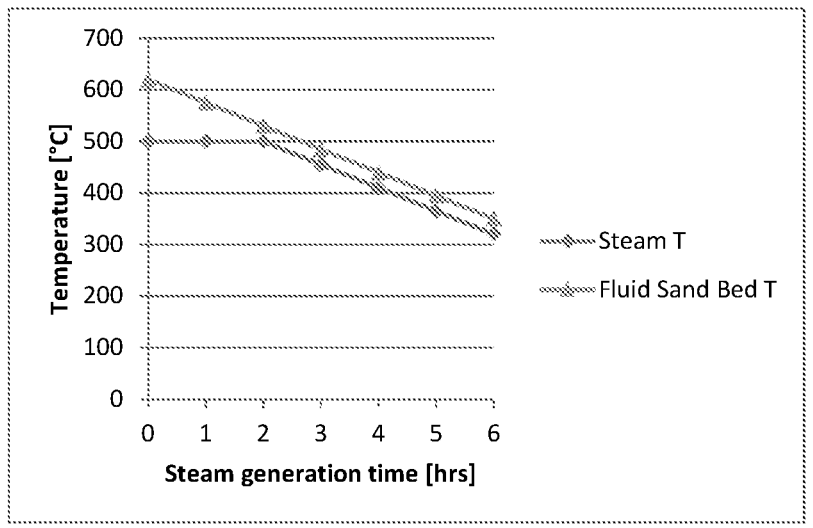
Figure 3:
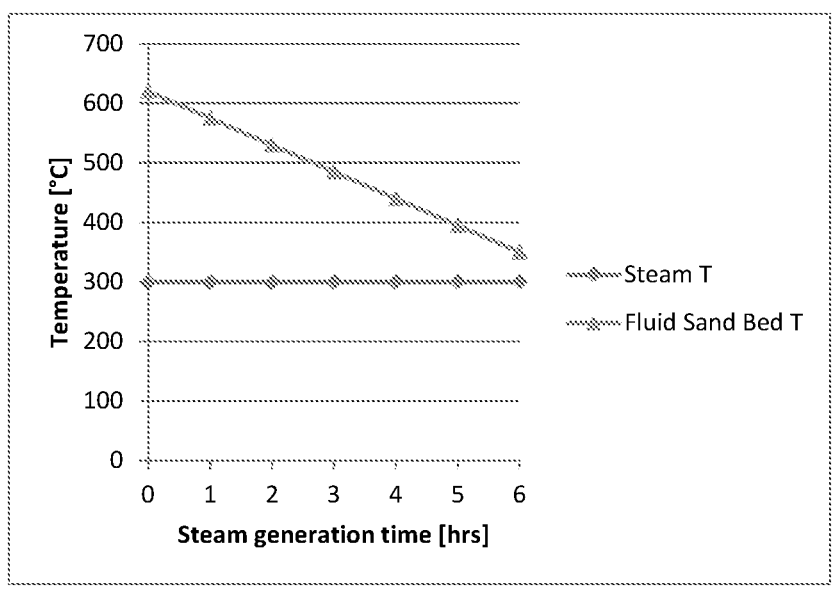
Figure 4:
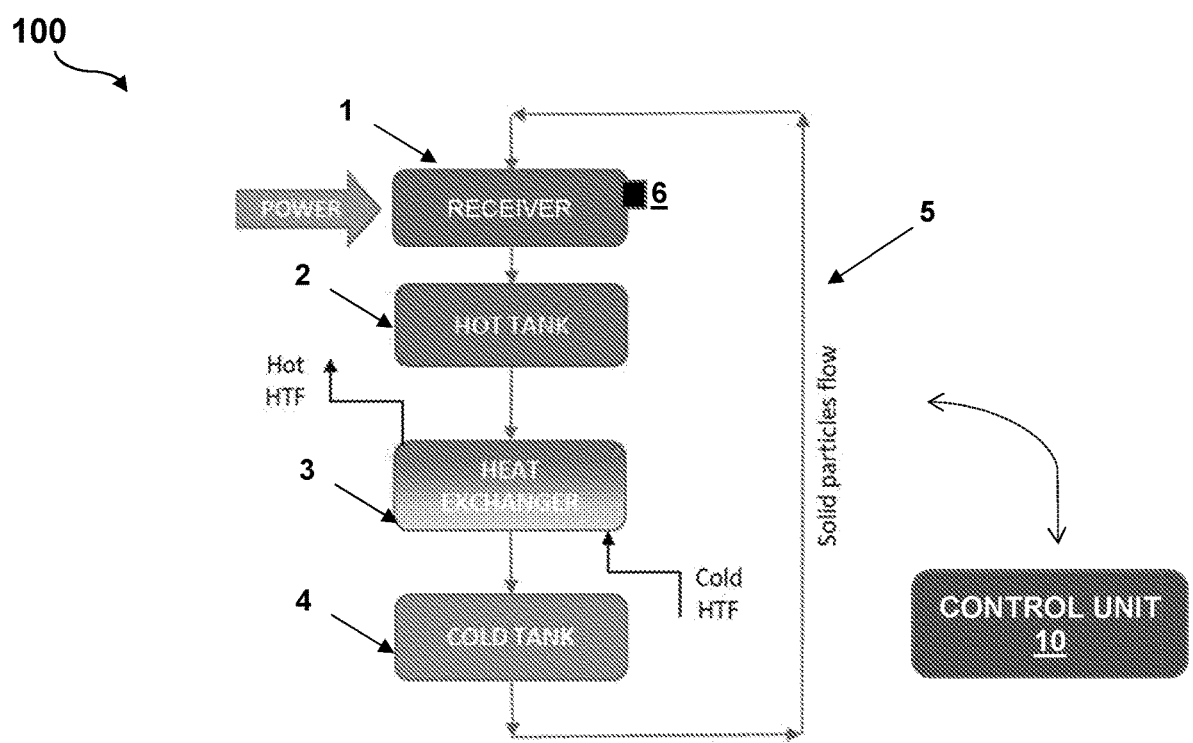
FIG. 4 shows a block diagram illustrating a concept scheme of an embodiment of a heat exchange and thermal energy storage apparatus according to the present invention.

A heat exchange apparatus 100 according to a preferred embodiment of the invention is conceptually illustrated in FIG. 4.

The apparatus 100 includes a receiver device 1, or receiver, for the capture and temperature stabilization of thermal energy into a fluidized bed of solid particles. Such device is denoted as "receiver" in said FIG. 4. Heat is provided to said bed by an energy source ("power" in FIG. 4) e.g. the solar radiation or another energy source. The latter can include, e.g., electric resistors, immersed in the bed or in thermal connection therewith, as indicated in the "Summary" section of the present disclosure.

The general configuration of device 1 can be one as disclosed, e.g., in WO2017/021832A1, WO2018/142292A1, WO2013/150347A1 or WO2020/136456A1.

Downstream device 1 with respect to the solid particles physical flow a hot tank 2 is located, which receives a physical flow of the hot particles making up the bed of device 1. The hot tank 2 has the function of accumulating hot particles for the desired time; its capacity allowing for the desired thermal energy storage. The particles which are physically displaced from the device 1 into the hot tank 2 can be the whole bed hosted in the device 1 or a portion thereof. The bed can be configured so that a resident mass thereof remains in the device 1 at all times and another vector mass is displaced into the hot tank 2 and the subsequent elements of the apparatus 100. The volumes making up said two masses can also be adjusted or selected depending on the energetic needs. As mentioned above, in preferred applications, the resident mass is zero, meaning that the entire bed moves in the thermal circuit as disclosed herein. In specific configurations, the fluid bed level in the device 1 can vary, or be adjusted, during operation, between a maximum level and minimum level, to compensate possible differences between solid particle rate entering and leaving the receiver.

Downstream the hot tank 2 with respect to the thermal exchange flow and particle physical flow is located a heat exchanger 3. Therefore, in the present configuration the heat exchanger 3 is not immersed in the fluid bed, but located externally to the device 1.

The heat exchanger 3 may be based upon a Heat Transfer Fluid (HTF), e.g. steam or (supercritical) $CO_2$. Preferably, the heat exchanger 3 operates in counter-current, i.e. the bed particles and the HTF flow in opposite directions within the exchanger 3.

The heat exchanger 3 may include a plurality of units, also operating according to different exchange principles or fluids.

Downstream the exchanger 3, a cold tank 4 is located, which receives the cold solid particles after they have transferred heat to the HTF.

The apparatus 100 further comprises means for circulating the vector mass of the bed particles from the device 1 into components 2 to 4 introduced above and back into device 1. Said means are schematically represented by arrows in FIG. 4 and globally denoted by 5. They may be based, e.g., upon mechanical conveyor(s), gravity feeding, elevator(s) or other means.

A local or remote control unit 10 of apparatus 100 may control or commands the various elements introduced above and determine the operational modes and/or parameters concerning the flow of particles and the heat exchange.

The control unit 10 may be configured to control the flow of said vector mass within the apparatus on the basis of parameter values pre-programmed and/or detected by parameter detecting means 6, arranged at one or more selected locations of the apparatus 100. In particular, the control unit 10 may adjust the particle mass flow rates entering and leaving the device 1, according to the available power input in order to keep the detected value of the fluid bed temperature within the desired range. As well, the control unit 10 may be configured to control the heat exchanger 3 operation, particularly by adjusting the solid particles mass flow rate crossing the heat exchanger, according to the HTF mass flow rate and temperature desired for use.

Advantageously, all the equipment elements, e.g. of the device 1, the hot and cold tanks 2, 4, the heat exchanger 3 and the relevant transfer means are thermally insulated to limit heat losses.

The general operational modes of apparatus 100 are illustrated below.

As explained above, the solid particles, or a vector mass thereof, are not contained in the device 1 permanently, but transferred, in sequence, from the device 1 to the hot tank 2, to heat exchanger 3, to cold tank 4 and finally recirculated into the device 1.

Solid particles are heated up in the device 1, e.g. by solar source, electricity, process heat or other.

When solid particles have reached the desired maximum temperature in the device 1, i.e. when thermal energy has been charged in the fluid bed, the solid particles are extracted, in a batch/discrete or continuous mode, from the device 1 and conveyed to the hot tank 2.

The temperature field of the fluid bed of device 1 can be continuously monitored by means of dedicated thermocouples 6, or other temperature sensors or transducers, preferably in communication with control unit 10, so to allow the discharge of solid particles to the hot tank 2 when their temperature has reached the desired value, optimal for the heat exchanger 3 operation.

The hot tank 2 is configured with a size to ensure the desired thermal energy storage capacity. When energy is to be released to the HTF, solid particles are delivered from the hot tank 2 to the external heat exchanger 3. Thermal energy stored in the hot tank 2 can be released during a concurrent thermal power charging phase occurring into the device 1 based upon the resident bed mass or at a deferred time, according to specific process needs.

The external heat exchanger 3, preferably realized in a counter-current configuration, receives the hot solid particles and the HTF leaves the heat exchanger 3 at a temperature just slightly less than the temperature of the hot particles entering the receiver. For example, making reference to the example illustrated in the "Background" section of the present disclosure in conjunction with supercritical $CO_2$, the latter can be produced at 700° C., having the solid particles at, e.g., 720° C. as maximum temperature, thus solving the criticalities highlighted with reference to the known art.

The solid particles, after having released their heat content to the HTF, leave the external heat exchanger 3 at a "cold" temperature and are delivered to the cold tank 4, e.g., as mentioned above, by gravity, by mechanical extractors or other means.

The cold tank 4 receives the solid particles during HTF generation and may store the particles until next heating phase in the device 1 starts. The cold tank 4 has preferably at least the same size of the hot tank 2, so that the heat content associated with the entire particle mass stored in the hot tank 2 can be released to the HTF in the heat exchanger 3.

Finally, the solid particles are circulated back, by means 5, from the cold tank 4 to the device 1, where they are heated up again by the power source.

During solid particles recirculation to the device 1, a preheating of solid particles can be provided, for example by electrical heaters, radiant burners or other heating means located, for example, within transport conveyors.

According to preferred control modes, the mass flow rate of solid particles to be recirculated into the device 1 is adjusted according to the actual amount of input power entering the device. Such control may be performed by the control unit 10, e.g. by means of a frequency converter regulating the speed of a mechanical extraction system from the cold tank. When the available input power to the device 1 increases/decreases, the particle flow rate recirculated into the device 1 can be proportionally increased/decreased, thus helping to keep the solid particles temperature inside the device within the desired temperature range.

According to a variant embodiment, the device 1 and the hot tank 2 can be integrated in a single unit or the hot tank 2 can be omitted. This variant embodiment may be useful, e.g., in case the HTF is to be generated not contemporarily with the energy charge in the device 1, but only at a deferred stage.

In this alternative configuration, the cold solid particles recirculated from the cold tank 4 to the integrated fluidized bed receiver/hot tank device—or to the receiver 1 only—fill it up before the next energy charging phase starts, in particular with no mixing of cold particles with hot particles during HTF generation.

In case the device is charged by solar power, like in a concentrated solar power system, solar radiation can be introduced in the fluid bed receiver directly from a heliostat field or through a secondary reflection, e.g. by a beam-down mirror.

Figure 9:
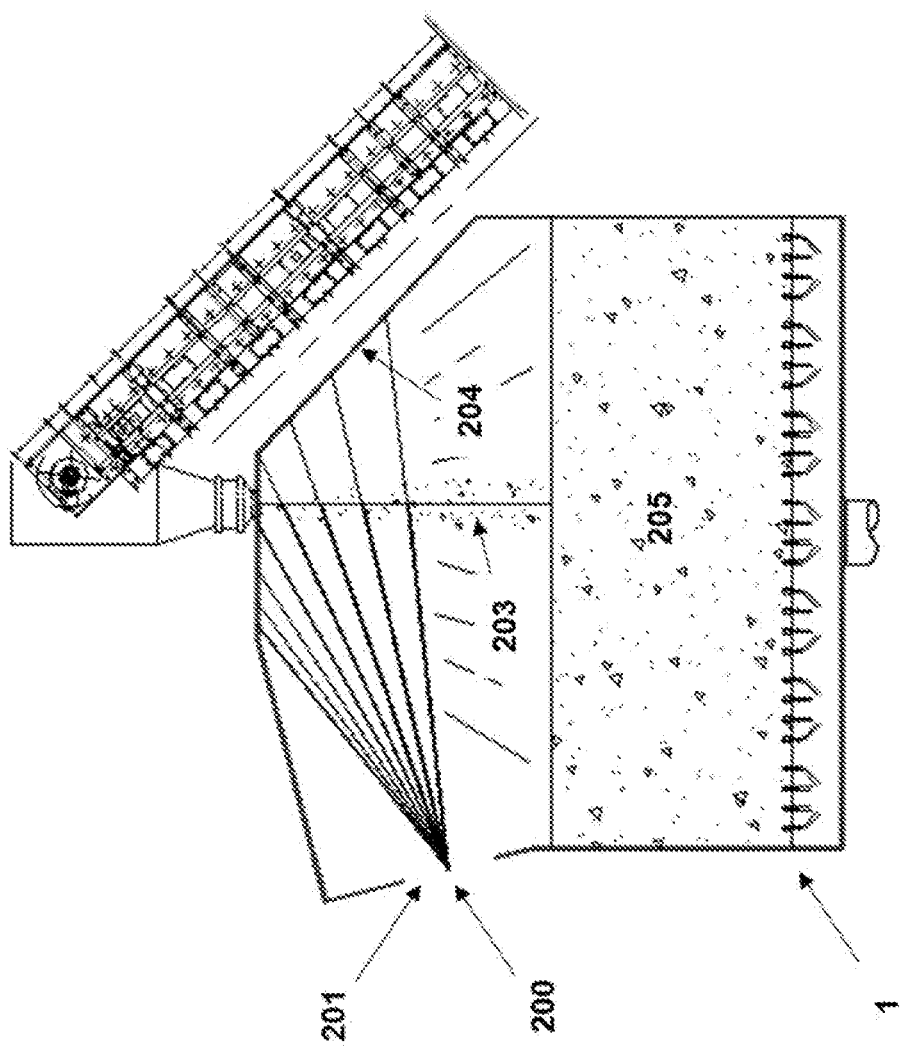
FIG. 9 shows a lateral view of a possible way to reintroduce the solid particles into a fluid bed in presence of highly concentrated solar radiation, according to an embodiment of the present invention, which is based upon the arrangement shown in FIG. 4.

According to a preferred embodiment of said receiver device 1 shown in FIG. 9, the recirculation of solid particles into the receiver can be realized in such a way that the solar radiation 200 entering the receiver, preferably through a window 201 on a lateral wall, impinges the solid particles 203 while they are falling into the device. In this way, the receiver internal linings 204 are protected from particularly intense radiation fluxes and a first heating the particles is obtained before they reach the rest of the fluid bed 205, where their heating goes on and is completed until the particles temperature has reached the value desired for use.

Still in case of a concentrated solar system, the power entering the receiver can be estimated, at any time, by measuring the actual solar radiation (e.g. the DNI, Direct Normal Irradiance) in the heliostat field by means of conventional instrumentation, e.g. by a pyrheliometer, and elaborating it by means of known optical performance algorithms.

In case the receiver is charged by thermal power from electricity (Joule effect), input power can be estimated by means of conventional instrumentations, such as wattmeters; as well in case the receiver is charged with heat by hot fluid, input power can be derived from conventional hot gas flow rate and temperature/pressure measurements.

Figure 4A:
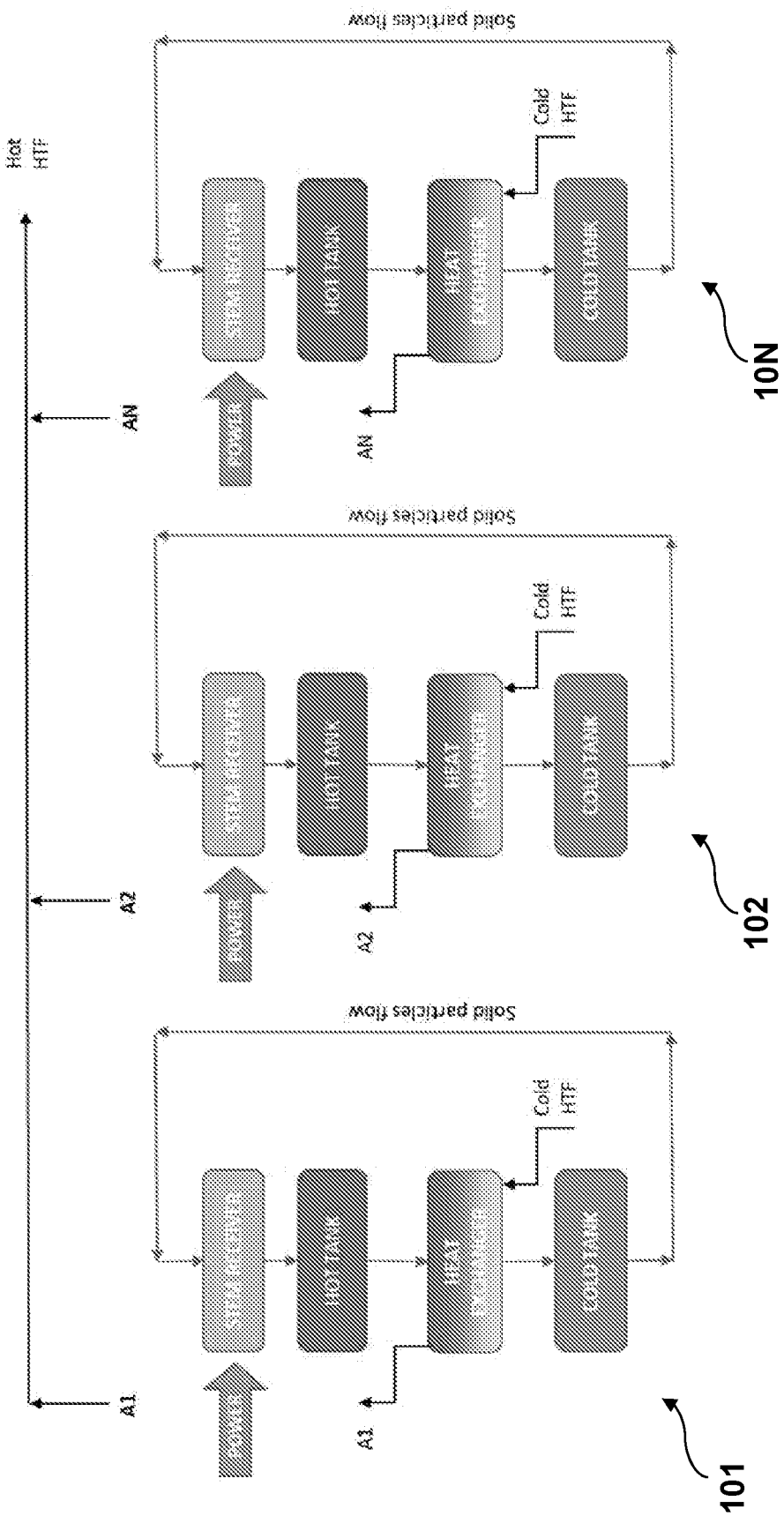
FIG. 4A shows a block diagram illustrating a concept scheme of an embodiment of a heat exchange and thermal energy storage system according to the present invention, which is based upon the arrangement shown in FIG. 4.

According to a preferred embodiment of a heat exchange and thermal energy storage system, a plurality of apparatuses, or modules, as those illustrated in FIG. 4 can be arranged in parallel, as conceptually shown in FIG. 4A, wherein said apparatuses are denoted by 101, 102, ..., 10N, respectively. In this embodiment, the hot HTF flows A1, A2, ..., AN produced by each module are delivered together to a final user.

Figure 5:
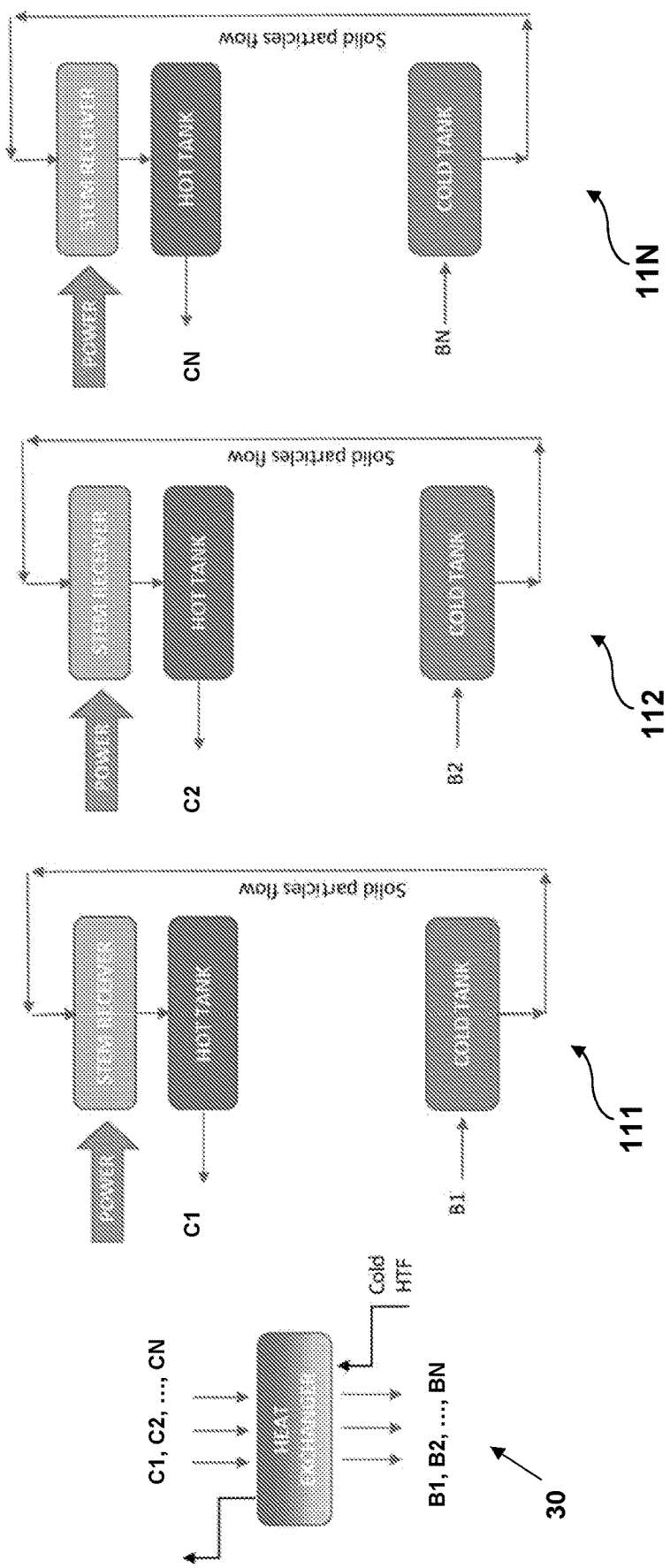
FIG. 5 shows a block diagram illustrating a concept scheme of another embodiment of a heat exchange and thermal energy storage apparatus and system according to the present invention.

According to another embodiment of a heat exchange system and thermal energy storage, exemplified in FIG. 5, a plurality of apparatuses, or modules, 111, 112, ... 11N can be integrated together, having a heat exchanger 30 in common. In this case, the solid particles from each hot tank or from each receiver of a respective apparatus are conveyed to the common heat exchanger 30 as flows C1, C2, CN, and from there recycled back as flows B1, B2, ... BN to each respective cold tank.

The system configuration of FIG. 5 can be advantageously used in cases where the heat exchanger must be located close to the hot HTF usage area. For instance, in case of electricity production by means of a supercritical $CO_2$ turbine, supercritical $CO_2$ must be produced at high temperatures and high pressure (respectively, e.g., greater than 700° C. and 200 bar), in order to allow highly efficient conversion cycles. These conditions require the use of special materials, able to withstand the severe thermomechanical stresses deriving from the combination of high temperature and pressure, particularly in the heat exchanger and for the supercritical $CO_2$ piping from the heat exchanger to the supercritical $CO_2$ turbine. The length of those piping can thus be minimized by the proposed configuration, containing the risk of potential failure and excessive costs.

Therefore, again, in FIG. 5 a heat exchanger 30 common to several apparatuses is used, in such a way that, in selected applications, it can be located just close to the supercritical $CO_2$ turbine, thus minimizing relevant piping length, whereas the solid particles are conveyed to and from the heat exchangers by means, e.g., of mechanical conveyors, by gravity or other means.

Preferred embodiments for one or more elements of the circulation means 5 schematically represented by arrows in FIGS. 4 to 5 will now be described.

A reliable transportation of solid particles is preferably obtained by means of a mechanical conveyor resistant to high temperatures, preferably fully enclosed in an outer casing and/or thermally insulated to limit heat losses to the environment. Examples of suitable conveyors, in particular belt conveyors, may be based upon the general configurations disclosed in, e.g., WO2007/034289A1 or WO2017/013517A1.

Figure 6:
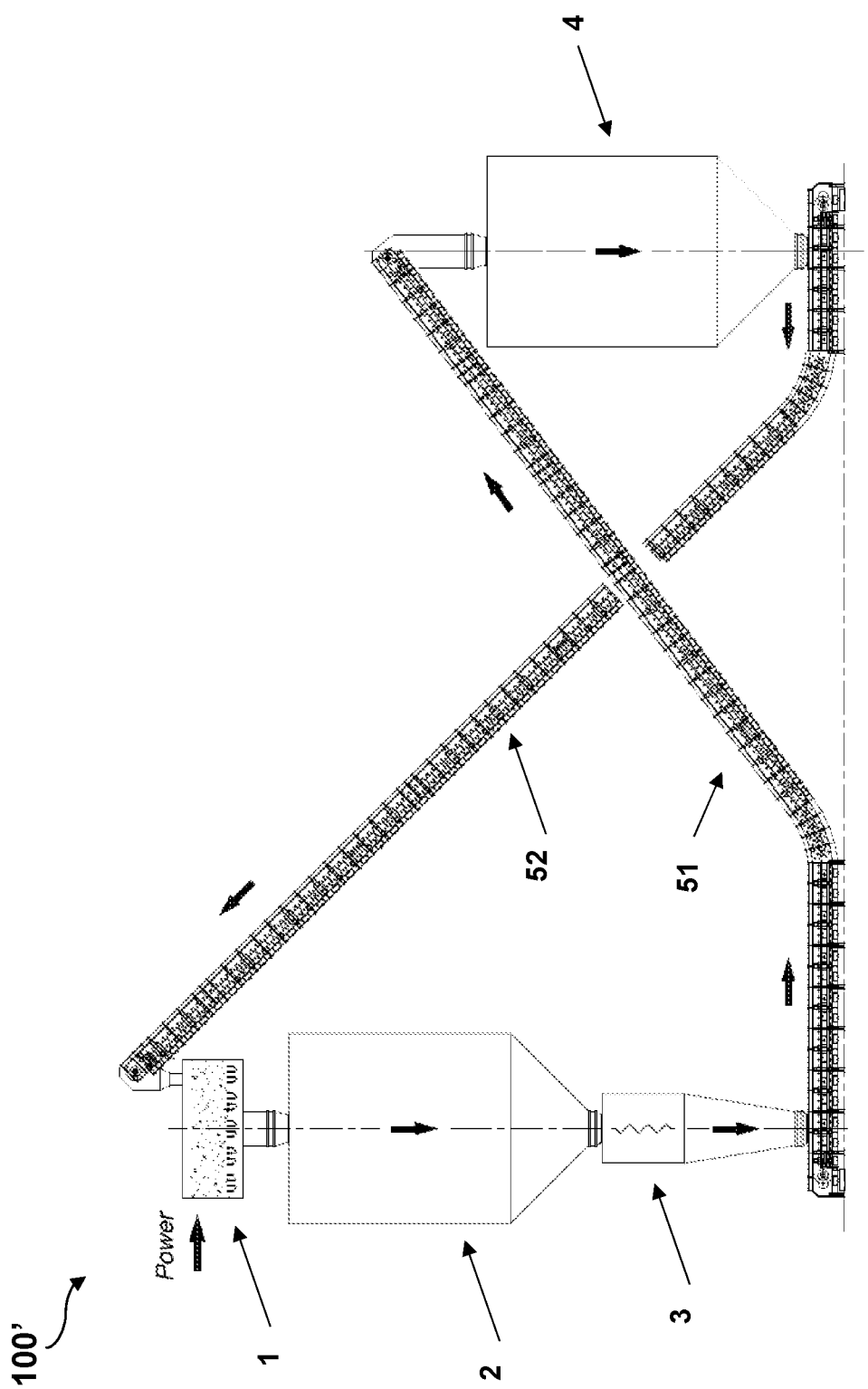
FIG. 6 shows a lateral view of an embodiment of a heat exchange and thermal energy storage apparatus according to the present invention, which is based upon the arrangement shown in FIG. 4.

An embodiment of apparatus configuration, indicated as 100', based upon the conceptual scheme of FIG. 4 is shown in FIG. 6. In this example, the receiver 1, hot tank 2 and heat exchanger 3 are arranged in a tower configuration, whereas the cold tank 4 is arranged aside, thus limiting the tower height.

Preferably, transportation of solid particles from the exchanger 3 to the cold tank 4 and from the latter again into the receiver 1 is obtained by a combination of respective inclined conveyors denoted by 51 and 52.

As an example of dimensioning a device and system as associated to the configuration of FIG. 6, the following is noted.

According to the scheme of FIG. 6, the apparatus incorporates a fluid bed receiver, a hot tank, a cold tank and a supercritical $CO_2$ ($sCO_2$) heat exchanger, producing $sCO_2$ that drives a Brayton power cycle turbine (not shown in FIG. 6), for electricity generation. Supercritical $CO_2$ turbines are being developed, aiming at reaching thermal to electric conversion efficiency close to 50%, provided that $sCO_2$ is produced steadily at temperature around 700-720° C. (and pressure greater than 200 bar).

Assuming for the CSP plant a given power output, for example for all day long electricity generation, i.e. also in absence of sun, the hot and cold tank shall have enough capacity to store the solid particles to ensure power generation during night, whereas the receiver shall be capable to capture solar power, during daytime, to be then released during the entire day to the $sCO_2$ loop and the solid particles recirculation system shall be sized to handle the necessary mass flow rate.

Assuming, for instance, 3 MWe power output, 24 hours per day electricity generation (8 hours daytime plus 16 hours night time), solid particles with 1200 J/kgK specific heat capacity, $sCO_2$ turbine efficiency at 47%, solid particle to $sCO_2$ countercurrent heat exchanger with 200° C. solid particles temperature drop (e.g. 750° C. to 550° C.) and efficiency at 95%, receiver efficiency at 85%, it comes out that:

the receiver 1 shall be sized to receive 23.7 MWt average solar power during daytime;

the heat exchanger 3 shall be crossed by 101 t/h solid particle continuously, all day long;

the inclined conveyor 51 shall be handling the 101 t/h solid particles mass flow rate, at 550° C.;

the hot tank 2 and cold tank 4 shall ensure at least 1613 tons capacity, with material temperatures respectively of 750° C. and 550° C. (neglecting minor heat losses during transportation);

the inclined conveyor 52 shall transport 303 t/h solid particles rate from cold tank 4 to receiver 1 during daytime, at 550° C.

Thus, the receiver 1 will be fed with solid particles at a rate of 303 t/h, during daytime, and will be discharging 303 t/h to the hot tank 2 by a dosing device (not shown in FIG. 6). Assuming, for instance, a capacity for the receiver of 300 tons, the solid particles will have almost 1 hour to be heated up under the average solar power of 23.7 MWt.

This time is much longer than other CSP solid particles technologies and, thanks also to the high thermal diffusivity of the fluid bed and possibility to monitor in real time the particles temperature, e.g. by means of thermocouples immersed in the fluid bed, the proposed configuration allows a much higher temperature stabilization and better control of the solid particles within the desired temperature range, before they are fed to the hot tank and then to the heat exchange. Proper temperature control of solid particles is of essence for the safe operation and high performance of the $sCO_2$ loop.

Figure 7:
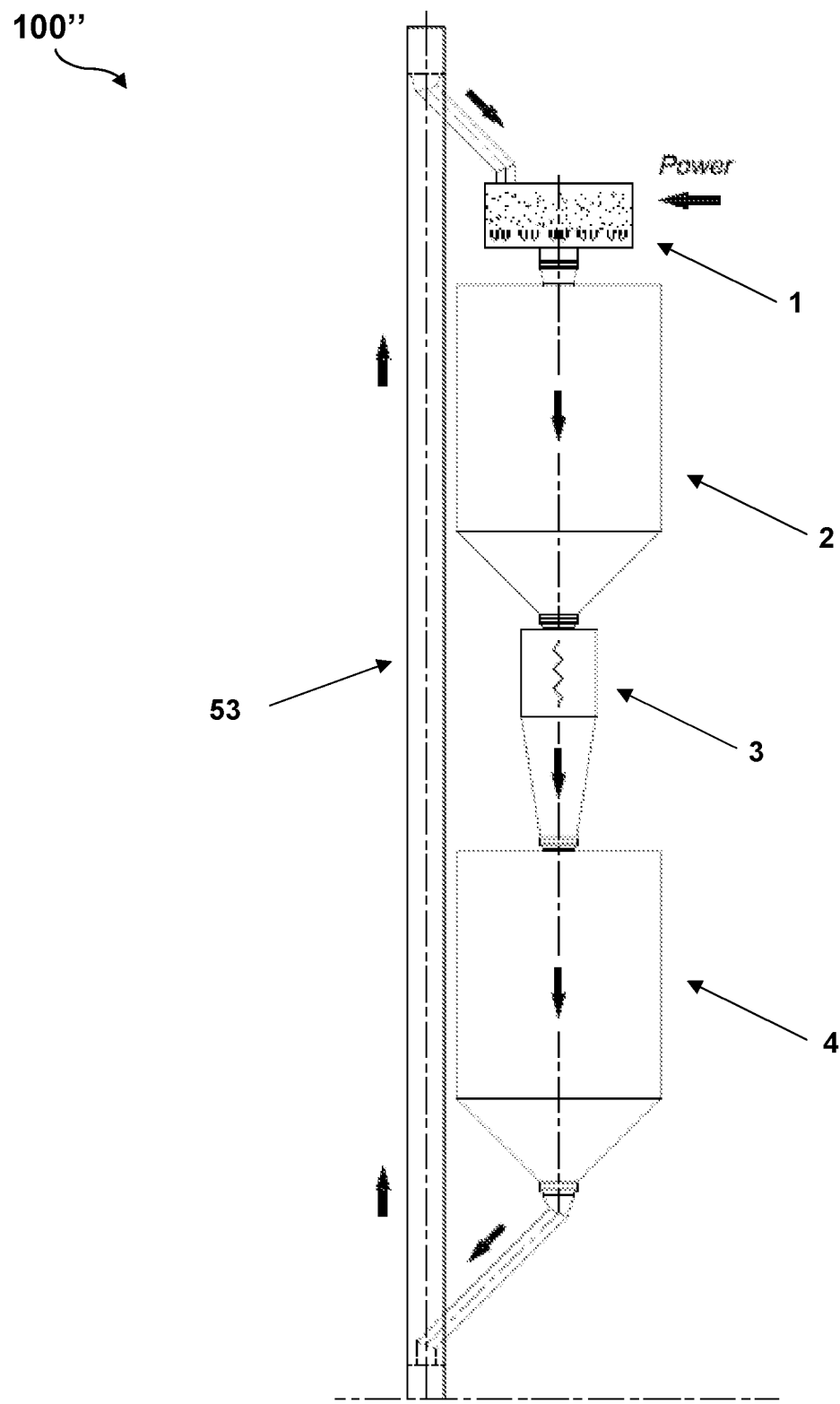
FIG. 7 shows a lateral view of another embodiment of a heat exchange and thermal energy storage apparatus according to the present invention, which is based upon the arrangement shown in FIG. 4.

FIG. 7 shows an alternative arrangement of an apparatus embodiment, denoted by 100", still based upon the conceptual scheme of FIG. 4, wherein the receiver 1, hot tank 2 and heat exchanger 3 are all arranged in a tower configuration.

This embodiment is particularly suitable for plants wherein the tower height is not an issue and horizontal land occupation must be minimized.

Downward transportation of solid particles from the various elements can be obtained by gravity and/or mass flow control devices, e.g. dosing valves interposed between adjacent elements 1-2, 2-3 and 3-4. Upward return transportation of the solid particles can be obtained, e.g., by a vertical elevator 53.

Figures 8A, 8B:
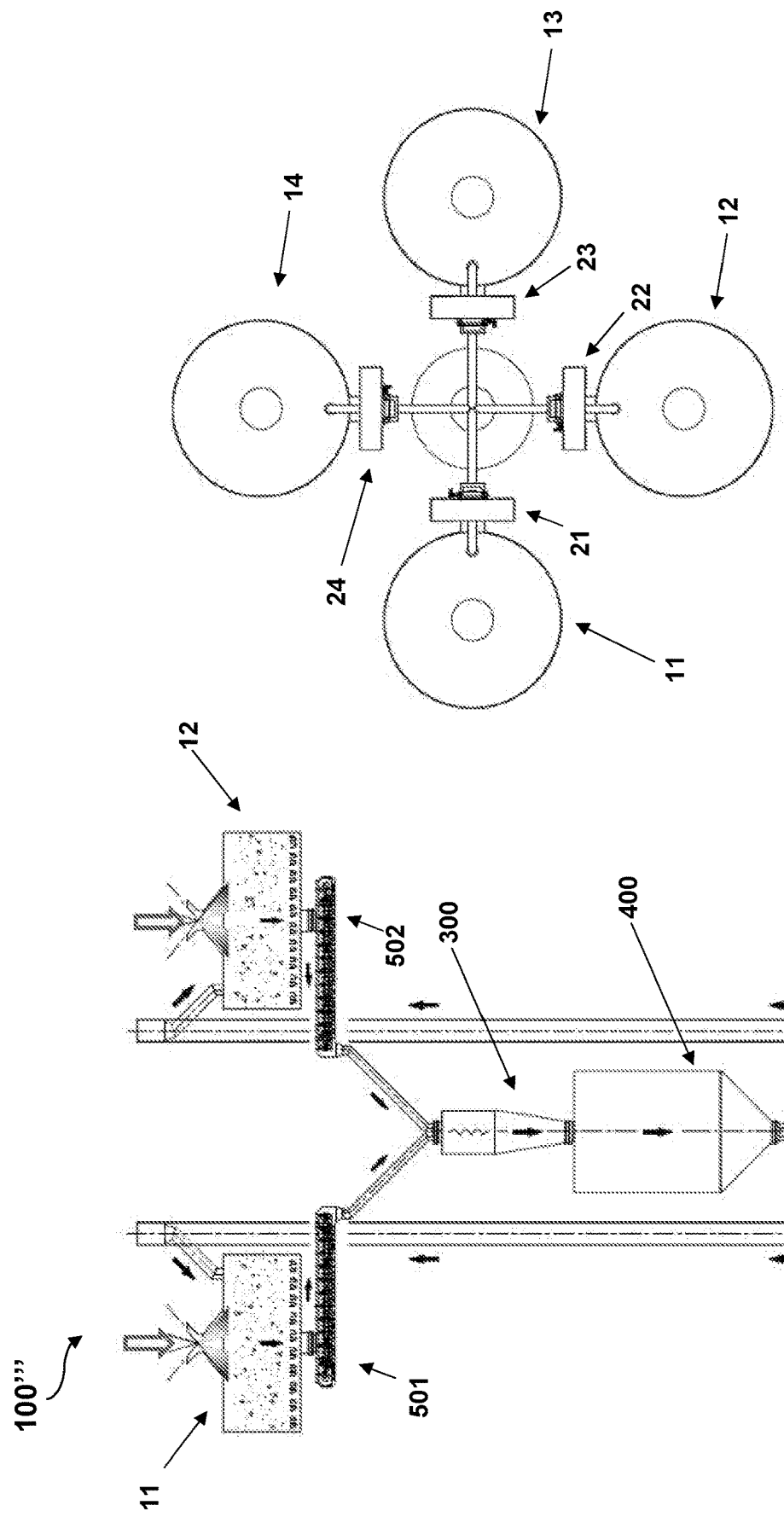
FIGS. 8A and 8B show a lateral and a top view, respectively, of a further embodiment of a heat exchange and thermal energy storage apparatus according to the present invention, which is based upon the arrangement shown in FIG. 4.

FIGS. 8A and 8B show a further embodiment of an apparatus configuration, herein denoted by 100''', which can still be regarded as generally based upon the conceptual scheme of FIG. 4 or 4A.

In this configuration, thermal power is charged into one or more fluid bed receivers, in particular four receivers denoted 11 to 14 in the example shown. The accumulated thermal energy is then delivered, by discharging respective hot solid particle masses, to a common set of heat exchanger 300 and cold tank 400. Common or separate hot tanks, eventually integrated into the respective receivers, may also be provided.

Still in the example illustrated, mechanical conveyors can be used to transfer the particles into the exchanger 300. Two of them are denoted, by way of example, as 501 and 502 in FIG. 8A. As well, mechanical conveyors and elevators, denoted by 21 to 24, can be used to recirculate the cold solid particles from the cold tank 400 to the four receivers 11 to 14.

In the configuration with hot tanks associated with, or integrated in, the respective receivers 11 to 14, the apparatus 100''' captures and stores thermal energy in the fluid bed receivers during the charging phase, keeping the solid particles contained in the receivers/hot tanks, and releases the relevant particles masses later on, during the HTF generation phase. Feeding of the particle mass from respective receivers 11 to 14 into the common exchanger 300 may be simultaneous or not, depending upon the specific energy generation needs and plant configuration.

The cold tank 400 may have at least the same capacity of the total capacity of the receivers 11 to 14, so to contain all the vector particle masses before the next charging phase starts.

Therefore, apparatus 100''' is suitable to be used when thermal energy charging in the receivers and heat exchange in the exchanger 300, i.e. HTF generation, are not contemporary.

For example, this configuration can be adopted to capture solar energy in a concentrated solar power system during daytime and produce the HTF in a deferred time, typically after sunset. Moreover, this configuration can be used to charge power (e.g. as provided by electricity, waste heat or other sources) into the fluidized bed when power is available at low cost, to be released at a later time, not simultaneous to the charging phase.

In other words, according to a preferred operative mode, cold particles from the cold tank are not recirculated to the fluid bed receivers during power charging phase or, in any case, the power charging and power exchange phase are shifted in time.

The invention further provides a method for accumulating and transferring thermal energy, based upon the functionalities already described above in relation to the apparatus and system of the invention.

The subject of the present disclosure has been so far described with reference to preferred embodiments thereof. It is to be meant that other embodiments belonging to the same inventive core may exist, all belonging to the protective scope of the herebelow reported claims.

The invention claimed is:

1. An apparatus for the accumulation and transfer of thermal energy, comprising:

a thermal energy charging device, having a fluid bed of solid particles received within a casing and acting as heat accumulation means by being exposed to a thermal energy source;

heat exchange means, configured for an exchange of thermal energy between a heated vector mass of said bed particles and an operative fluid, said heat exchange means being configured for counter-current exchange;

transport means, configured for feeding said vector mass of said bed particles from said energy charging device to said heat exchange means and for returning at least a part of said vector mass, downstream said heat exchange means, to said energy charging device;

parameter detecting means arranged at one or more selected locations of the apparatus and comprising temperature sensors; and a control unit, configured to control the flow of said vector mass within the apparatus on the basis of parameter values pre-programmed and of parameter values detected by said parameter detecting means, wherein said control unit is configured to adjust the particle mass flow rates entering and leaving said energy charging device according to the available power input so as to keep a detected value of the fluid bed temperature within a desired range, and wherein said control unit is configured to control operation of said heat exchange means by adjusting the solid particles mass flow rate crossing the heat exchange means according to the operative fluid mass flow rate and temperature desired for use.

2. The apparatus according to claim 1, wherein said energy charging device is configured to heat said bed particles by solar radiation, imping either directly or indirectly upon said bed particles, either with or without screen means interposed therebetween.

3. The apparatus according to claim 1, wherein said energy charging device is configured to heat said bed particles by electric means, in particular by one or more resistors immersed or in thermal connection with the bed of particles and heating them by Joule effect.

4. The apparatus according to claim 1, comprising a hot tank arranged downstream the, or each, energy charging device, or integrated therein, and configured as a storage container of the vector mass interposed between the energy charging device, or a part thereof exposed to the power source, and the heat exchange means.

5. The apparatus according to claim 1, comprising a cold tank arranged downstream the heat exchange means and configured as a storage container of the vector mass interposed between the heat exchange means and a portion of the transport means bringing the vector mass back into said energy charging device.

6. The apparatus according to claim 5, wherein said or each energy charging device, said hot tank, said heat exchange means and/or said cold tank have a tower arrangement, with the one or more energy charging devices at a top part and the other elements below them.

7. The apparatus according to claim 5, wherein said cold tank is arranged laterally with respect to said or each energy charging device, said hot tank and/or said heat exchange means.

8. The apparatus according to claim 1, further comprising a plurality of thermal energy charging devices, each having a respective fluid bed of solid particles received within a casing and acting as heat accumulation means by being exposed to a thermal energy source.

9. The apparatus according to claim 8, further comprising heat exchange means and/or cold tank common for the plurality of thermal energy charging devices and configured to be selectively fed by one or more respective vector masses of said devices.

10. The apparatus according to claim 1, wherein said heat exchange means is configured to operated with steam, $CO_2$ or supercritical $CO_2$ as operative fluid.

11. The apparatus according to claim 1, wherein said transport means comprises one or more mechanical conveyors.

12. The apparatus according claim 11, wherein one are more mechanical conveyors are belt conveyors.

13. A system for the accumulation and transfer of thermal energy, comprising a plurality of apparatuses each according to any of the claim 1, arranged in parallel with respect to a flow of said operative fluid.

14. A method for accumulating and transferring energy in thermal form, comprising the following steps:
a thermal energy charging step, wherein a fluid bed of solid particles is exposed to an energy source;
a thermal exchange step, wherein at least a vector mass of said heated bed particles is circulated into heat exchange means operating in counter-current so as to transfer heat to an operative fluid;
a transporting step of said vector mass back to said charging step;
wherein the flow of said vector mass is controlled on the basis of pre-programmed and detected parameter values including temperature,
wherein the particle mass flow rates entering and leaving said energy charging step is adjusted according to the available power input so as to keep a detected value of the fluid bed temperature within a desired range,
and wherein said heat thermal exchange step is controlled by adjusting the solid particles mass flow rate of the vector mass circulated into the heat exchange means according to the operative fluid mass flow rate and temperature desired for use.

15. The method according to claim 14, wherein said energy source is a solar energy source.

16. The method according to claim 14, wherein said energy source is an electric energy source, or a residual thermal energy source, thermal waste coming from other industrial plants.

17. The method according to claim 16, wherein the electric energy source is from renewables and the residual thermal energy source is thermal waste coming from other industrial plants.

18. The method according to claim 14, wherein said operative fluid is steam, $CO_2$ or supercritical $CO_2$.

19. The method according to claim 14, wherein a thermal energy charging step is simultaneous with a thermal exchange step.

20. The method according to claim 14, wherein said thermal exchange step is deferred with respect to any thermal energy charging step.

* * * * *